(12) United States Patent
Kleyner

(10) Patent No.: US 9,221,584 B2
(45) Date of Patent: Dec. 29, 2015

(54) CEREAL BAG WITH CRUMB COLLECTOR

(71) Applicant: Smartland, Cleveland, OH (US)

(72) Inventor: Vadim Kleyner, Gates Mills, OH (US)

(73) Assignee: Smartland, Cleveland, OH (US)

( * ) Notice: Subject to any disclaimer, the term of this patent is extended or adjusted under 35 U.S.C. 154(b) by 0 days.

(21) Appl. No.: 14/293,329

(22) Filed: Jun. 2, 2014

(65) Prior Publication Data

US 2015/0344186 A1  Dec. 3, 2015

(51) Int. Cl.
*B65B 9/00* (2006.01)
*B65D 30/22* (2006.01)
*B65B 5/02* (2006.01)
*B65B 5/06* (2006.01)
*B65B 51/02* (2006.01)

(52) U.S. Cl.
CPC .............. *B65D 31/12* (2013.01); *B65B 5/022* (2013.01); *B65B 5/067* (2013.01); *B65B 51/02* (2013.01)

(58) Field of Classification Search
CPC ...... B65B 3/003; B65B 31/024; B65B 5/061; B65B 9/06; B29L 2031/14; B32B 27/10
USPC ........... 53/170, 393, 410, 416, 449–467, 475, 53/562, 570
See application file for complete search history.

(56) References Cited

U.S. PATENT DOCUMENTS

| | | | |
|---|---|---|---|
| 3,159,096 A * | 12/1964 | Tocker ........................... | 100/211 |
| 3,229,813 A * | 1/1966 | Crowe, Jr. et al. ............. | 206/439 |
| 4,557,377 A * | 12/1985 | Maloney ....................... | 206/219 |
| 4,576,316 A * | 3/1986 | Foster ......................... | 222/541.6 |
| 4,889,619 A | 12/1989 | Lynch | |
| 4,892,832 A * | 1/1990 | Omote et al. ............... | 435/297.1 |
| 4,963,374 A * | 10/1990 | Brandel et al. ................ | 426/107 |
| 5,059,036 A * | 10/1991 | Richison et al. ............. | 383/61.2 |
| 5,147,272 A * | 9/1992 | Richison et al. ............. | 493/195 |
| 5,353,927 A * | 10/1994 | Stupar et al. .................. | 206/219 |
| 5,373,966 A * | 12/1994 | O'Reilly et al. ................ | 222/94 |
| 5,582,731 A * | 12/1996 | Gianfranco ........ | B65D 85/8043 206/0.5 |
| 5,618,105 A * | 4/1997 | Baker .......................... | 366/130 |
| 5,674,391 A * | 10/1997 | Nohren, Jr. ............. | C02F 1/283 210/266 |
| 5,755,962 A * | 5/1998 | Gershenson ........... | B01D 25/24 210/452 |
| 5,785,428 A * | 7/1998 | Mazzocchi .................... | 383/103 |
| 5,914,142 A * | 6/1999 | Zartner ......................... | 426/113 |
| 5,958,483 A * | 9/1999 | Anders et al. ................. | 426/112 |
| 5,961,676 A * | 10/1999 | King ......................... | A47L 9/00 15/347 |
| 5,976,380 A * | 11/1999 | Moya ................... | B01D 63/061 210/321.75 |
| 5,981,048 A * | 11/1999 | Sugimoto et al. ........... | 428/216 |
| 6,023,914 A * | 2/2000 | Richison et al. ................ | 53/410 |
| 6,030,123 A * | 2/2000 | Mitarai ........................... | 383/63 |
| 6,045,838 A * | 4/2000 | Davis et al. ................... | 426/106 |
| 6,085,695 A * | 7/2000 | Miller et al. .................. | 119/795 |
| 6,224,528 B1 * | 5/2001 | Bell ............................. | 493/196 |
| 6,274,181 B1 * | 8/2001 | Richison et al. ............. | 426/118 |
| 6,303,363 B1 * | 10/2001 | Ward ............................ | 435/243 |
| 6,318,894 B1 * | 11/2001 | Derenthal ..................... | 383/204 |

(Continued)

*Primary Examiner* — Robert Long
(74) *Attorney, Agent, or Firm* — Benesch, Friedlander, Coplan & Aronoff, LLP

(57) ABSTRACT

A bag includes a main compartment and a crumb collector compartment disposed below the main compartment. The bag includes a substantially horizontal non-continuous seal including a plurality of sealed portions and a plurality of open portions disposed between the sealed portions. The substantially horizontal non-continuous seal is disposed between the main compartment and the crumb collector compartment. The bag includes a continuous seal disposed below the crumb collector compartment.

5 Claims, 7 Drawing Sheets

(56) References Cited

U.S. PATENT DOCUMENTS

| | | | |
|---|---|---|---|
| 6,375,037 B1* | 4/2002 | Bell et al. | 222/1 |
| 6,423,356 B2* | 7/2002 | Richison et al. | 426/118 |
| 6,524,359 B1* | 2/2003 | Kluge | B01D 46/0001 156/204 |
| 6,595,159 B1* | 7/2003 | Montalbano | 119/167 |
| 6,702,461 B2* | 3/2004 | Vangedal-Nielsen | 383/38 |
| 7,004,631 B1* | 2/2006 | Egashira et al. | 383/64 |
| 7,537,840 B2* | 5/2009 | Miller | 428/474.4 |
| 8,062,683 B2* | 11/2011 | Rasmussen | B65D 85/816 426/431 |
| 8,277,121 B2* | 10/2012 | Bell et al. | 383/210 |
| 8,535,744 B1* | 9/2013 | Taghaddos | 426/393 |
| 8,573,845 B2* | 11/2013 | Turover et al. | 383/38 |
| 2003/0059128 A1* | 3/2003 | Vangedal-Nielsen | 383/4 |
| 2005/0139534 A1* | 6/2005 | Peet | B01D 35/0273 210/167.02 |
| 2005/0277191 A1* | 12/2005 | Ellis | C12M 23/08 435/404 |
| 2005/0286808 A1* | 12/2005 | Zimmerman et al. | 383/43 |
| 2006/0045392 A1* | 3/2006 | Bannister et al. | 383/100 |
| 2006/0157140 A1* | 7/2006 | Bergman et al. | 141/65 |
| 2006/0204148 A1* | 9/2006 | Kohn | 383/9 |
| 2007/0014898 A1* | 1/2007 | Spirk et al. | 426/106 |
| 2007/0134382 A1* | 6/2007 | Schmal et al. | 426/412 |
| 2007/0215610 A1* | 9/2007 | Su et al. | 219/730 |
| 2007/0267319 A1* | 11/2007 | Farley et al. | 206/554 |
| 2008/0017043 A1* | 1/2008 | O'Brien | 99/287 |
| 2008/0173385 A1* | 7/2008 | Ansinn | 156/64 |
| 2008/0256901 A1* | 10/2008 | Custer et al. | 53/405 |
| 2009/0071896 A1* | 3/2009 | Mues et al. | 210/601 |
| 2009/0263546 A1* | 10/2009 | Rea | B65D 85/812 426/83 |
| 2009/0294336 A1* | 12/2009 | Jassim | 209/422 |
| 2010/0142859 A1* | 6/2010 | Cushman | 383/10 |
| 2011/0101004 A1* | 5/2011 | Spirk et al. | 220/660 |
| 2012/0275729 A1* | 11/2012 | Liang et al. | 383/72 |
| 2013/0102449 A1* | 4/2013 | Graboski et al. | 493/340 |
| 2013/0209628 A1* | 8/2013 | Turover et al. | 426/234 |
| 2013/0233886 A1* | 9/2013 | Long et al. | 222/95 |
| 2013/0272630 A1* | 10/2013 | Thomas et al. | 383/201 |
| 2014/0133784 A1* | 5/2014 | Liang et al. | 383/102 |
| 2014/0193653 A1* | 7/2014 | Combs et al. | 428/535 |
| 2015/0203291 A1* | 7/2015 | Saville et al. | 383/40 |

* cited by examiner

CEREAL BAG WITH CRUMB COLLECTOR

FIELD OF INVENTION

The present disclosure relates to the field of packaging. More particularly, the present disclosure relates to a bag for packaging cereal and collecting crumbs.

BACKGROUND

Cereal is commonly packaged in a plastic bag for sale to a consumer. In one example, the bag may be packaged inside a box as well for added support. When consuming cereal, the bag, or the box containing the bag, is tilted at an angle in order to allow for the cereal to poor out of the bag and into a bowl. When the desired amount of cereal is received in a bowl, the bag is returned to an upright position.

Cereal may be brittle and therefore some of the cereal in the bag may break up into small pieces and crumbs when the bag is handled, moved, or tilted. In addition, cereal may be coated in sugar or other coatings, some of which may separate from the cereal when the bag is moved or tilted. The cereal pieces and sugar (hereinafter collectively referred to as "crumbs") accumulate at the bottom of the cereal bag. When the bag is tilted to poor the cereal into a bowl, some of the crumbs may also spill into the bowl. It may not be desirable, however, to have crumbs in a bowl of cereal.

SUMMARY

A bag includes a main compartment and a crumb collector compartment disposed below the main compartment. The bag includes a substantially horizontal non-continuous seal including a plurality of sealed portions and a plurality of open portions disposed between the sealed portions. The substantially horizontal non-continuous seal is disposed between the main compartment and the crumb collector compartment. The bag includes a continuous seal disposed below the crumb collector compartment.

A cereal bag includes a top compartment and a bottom compartment disposed below the top compartment. The cereal bag includes a non-continuous seal including a plurality of sealed portions and a plurality of open portions disposed between the sealed portions. The non-continuous seal is disposed between the top compartment and the bottom compartment.

In a method for manufacturing a cereal bag with a crumb collector, a continuous first seal is formed substantially horizontal along a bottom of a cereal liner. A non-continuous second seal is formed substantially horizontal along a middle portion of the cereal liner, at an offset distance above the first seal. The cereal liner is filed with cereal. A continuous third seal is formed substantially horizontal along a top of the cereal liner.

BRIEF DESCRIPTION OF THE DRAWINGS

In the accompanying drawings, structures are illustrated that, together with the detailed description provided below, describe example embodiments of the claimed invention. Where appropriate, like elements are identified with the same or similar reference numerals. Elements shown as a single component may be replaced with multiple components. Elements shown as multiple components may be replaced with a single component. The drawings may not be to scale. The proportion of certain elements may be exaggerated for the purpose of illustration.

DETAILED DESCRIPTION

A cereal bag described herein allows for separation of crumbs from cereal and prevents crumbs from spilling into a bowl together with cereal. It should be understood that although the examples described herein refer to cereal and separating cereal crumbs, the bag can be used to package any food that is brittle and may produce crumbs inside a bag, wherein it may not be desirable to consume the crumbs together with the food.

Figure 1:
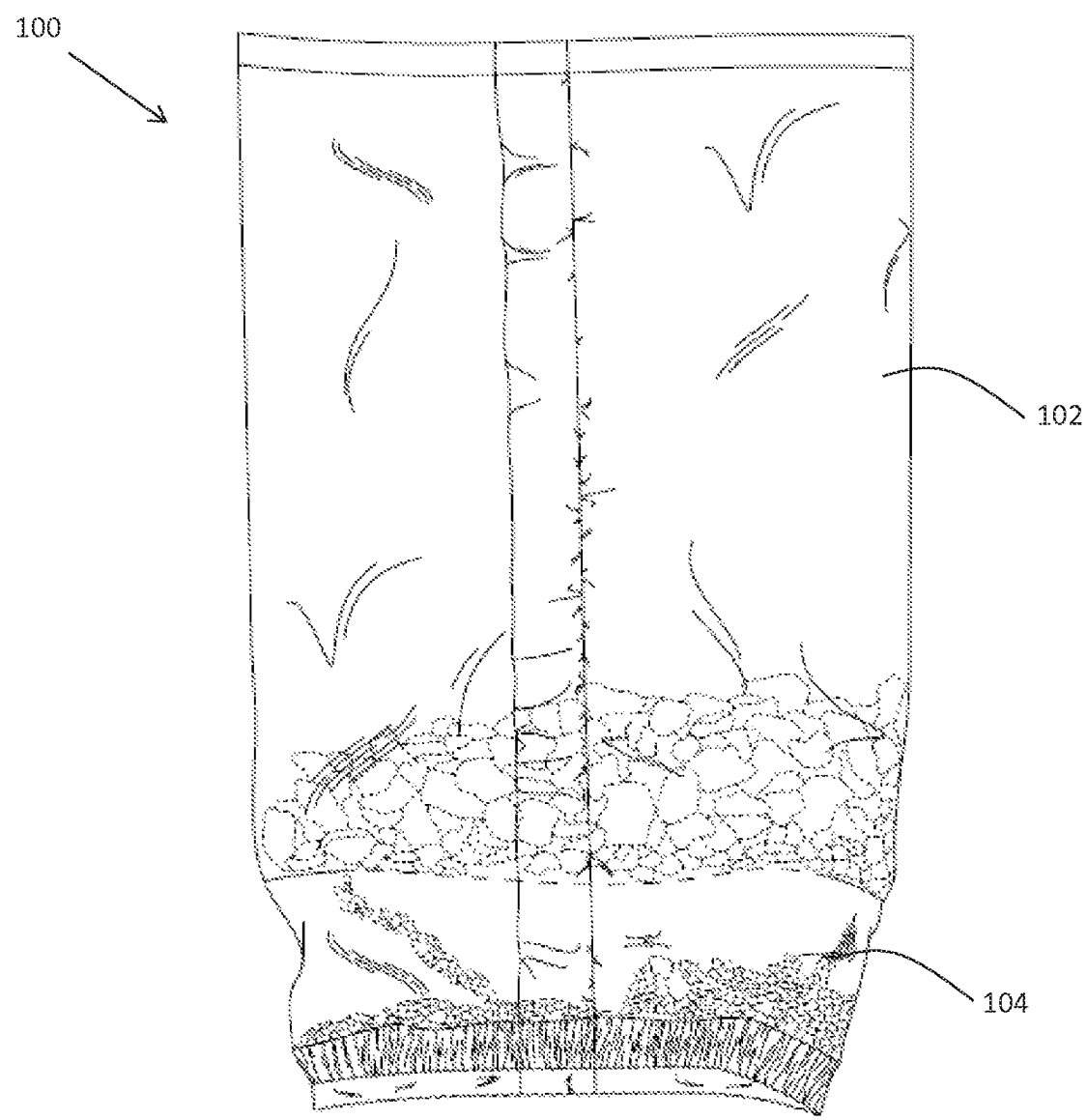
FIG. 1 illustrates an example cereal bag with crumb collector.

FIG. 1 illustrates an example cereal bag 100 for separating crumbs. Cereal bag 100 includes a top or main compartment 102 for storing cereal. Cereal bag 100 also includes a bottom or crumb collector compartment 104, positioned below the main compartment 102, that collects and stores crumbs as they separate from cereal in the main compartment 102. The crumb collector compartment 104 also prevents crumbs from re-mixing with the cereal when the cereal is being poured into a bowl.

Figure 2:
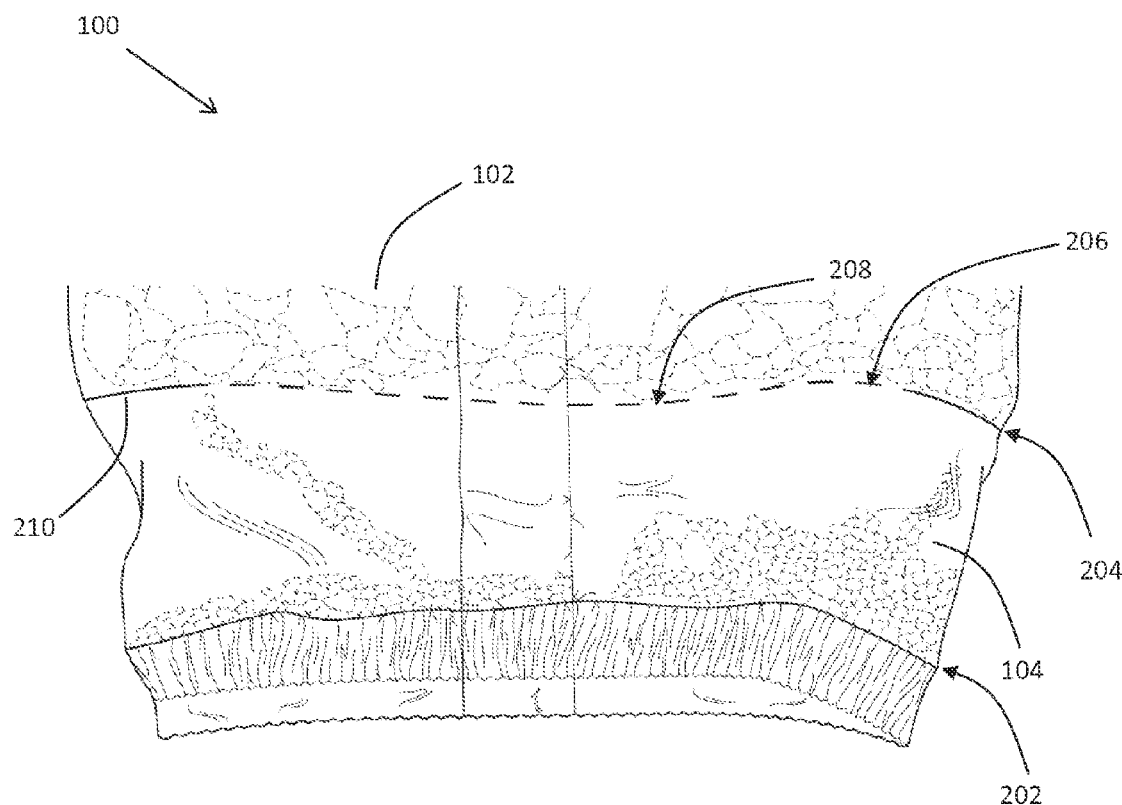
FIG. 2 illustrates an example cereal bag with crumb collector.

FIG. 2 illustrates a close-up view of the crumb collector compartment 104 positioned below the main compartment 102 of cereal bag 100 illustrated in FIG. 1. Cereal bag 100 includes a bottom seal 202 extending substantially horizontally across the bottom of cereal bag 100. Bottom seal 202 is continuous and therefore prevents cereal or any other contents from falling out from the bottom of cereal bag 100.

Cereal bag 100 further includes a middle seal 204 extending substantially horizontally across the cereal bag 100, at an offset distance above the bottom seal 202. For example, middle seal 204 can be positioned approximately one inch above the bottom seal 202. The middle seal 204 separates main compartment 102 from crumb compartment 104. It should be understood that middle seal 204 can be disposed at any suitable distance above bottom seal 202 in order to create a smaller or bigger crumb compartment 104.

Middle seal 204 is non-continuous. That is, the middle seal 204 includes several closed or sealed portions 206 which prevent larger objects such as whole pieces of cereal from moving into the crumb compartment 104 and several open portions 208 or slots which create small pathways for allowing crumbs to pass through into the crumb compartment 104. It should be appreciated that the size or length of the open portions 208 can vary depending on the contents to be stored in the cereal bag 100. For example, a cereal bag 100 that is designed to store large cereal may include a middle seal 204 with larger open portions 208 but a cereal bag 100 designed to store smaller cereal may include a middle seal 204 with smaller open portions 208. In addition, the number of open portions 208 may vary depending on how much filtering or separation is desired. For example, a middle seal 204 with a greater number of open portions 208 may be used to separate a greater amount of crumbs while a middle seal 204 with a smaller number of open portions 208 may be used to separate less crumbs.

In order to prevent crumbs from spilling back into the main compartment 102 when a cereal bag 100 is tilted towards a side, the outer-most sealed portions 210 of the middle seal 204 are extended in length as compared to the inner sealed portions 206. In one example, the outer-most sealed portions 210 are angled downward (not shown) towards the middle of the middle seal 204 in order to further facilitate crumbs being separated into the crumb compartment 104 and to prevent crumbs from falling back into main compartment 102 when the cereal bag 100 is tilted towards a side.

Figure 3:
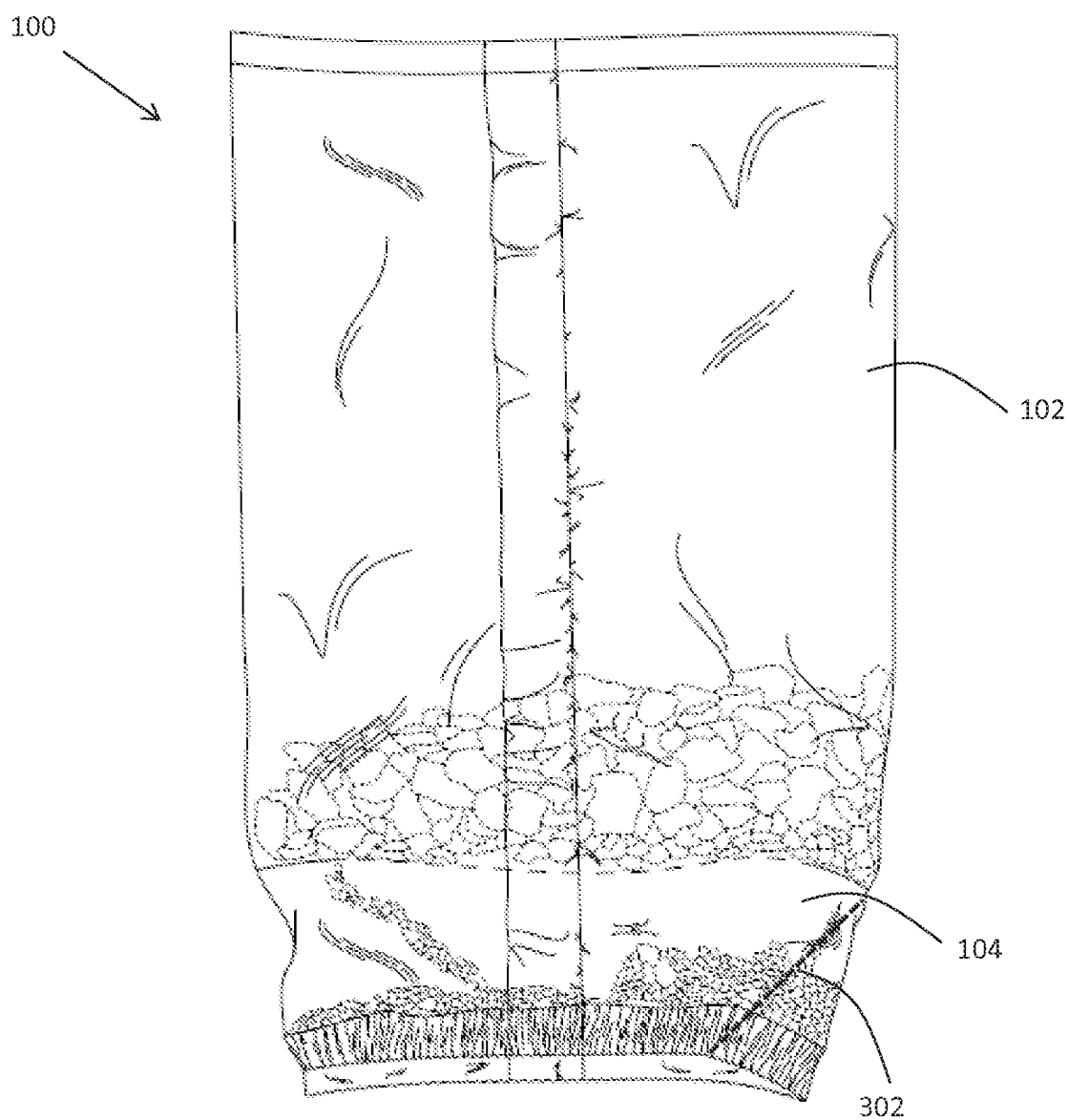
FIG. 3 illustrate an example cereal bag with crumb collector.

It may be desirable to consume the crumbs in crumb collector 104 separately from the cereal stored in main compartment 102. Accordingly, in one example as illustrated in FIG. 3, crumb compartment 104 includes a perforated portion 302 extending between a first side wall of the crumb collector compartment 104 and a bottom of the cereal bag 100. This allows for crumbs to be poured from the crumb compartment 104 separate from cereal being poured from main compartment 102.

Figure 4:
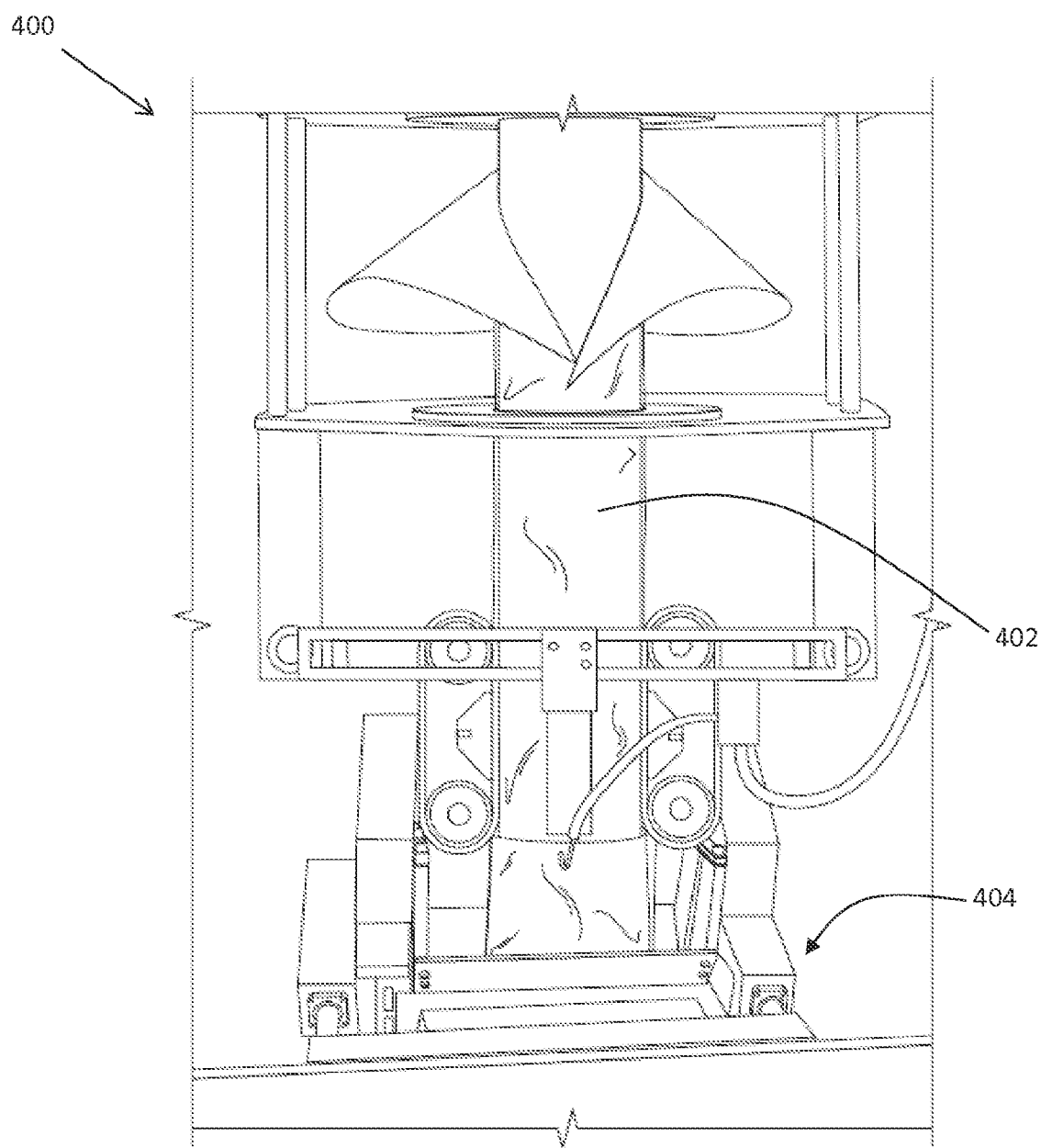
FIG. 4 illustrates an example cereal apparatus for filling a cereal bag with cereal and sealing the cereal bag.

FIG. 4 illustrates an example cereal apparatus 400 for filling a cereal bag 100 with cereal and sealing the cereal bag 100. A plastic material 402 is fed into cereal apparatus 400 where it is cut and sealed at sealing station 404 before being filled with cereal.

Figure 5:
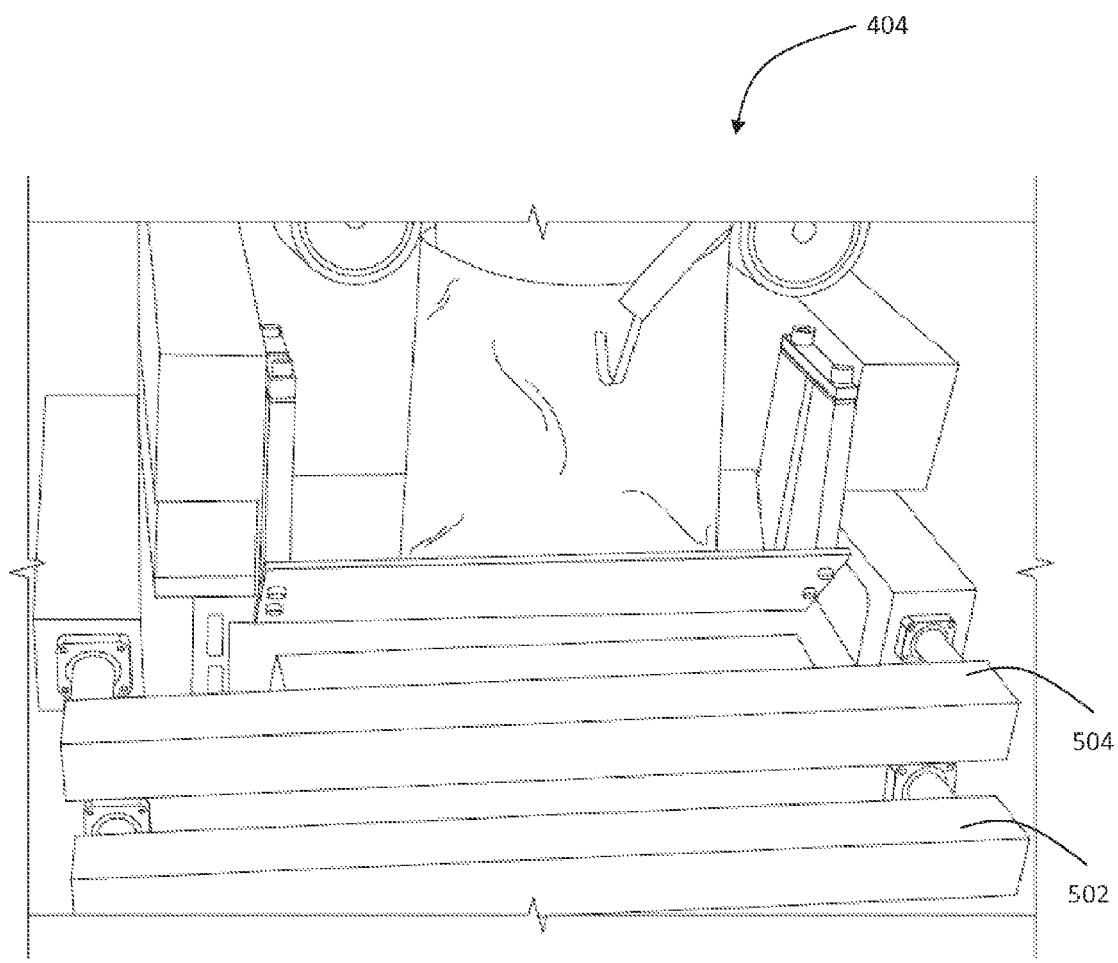
FIG. 5 illustrates an example cereal apparatus for filling a cereal bag with cereal and sealing the cereal bag.

FIG. 5 illustrates a close-up view of sealing station 404 of the cereal apparatus 400 of FIG. 4. Sealing station 404 includes a first sealing apparatus 502 and a second sealing apparatus 504. First sealing apparatus 502 is configured to form a substantially horizontal continuous bottom seal 202 by applying heat along a continuous line along the plastic 402 to create a bottom of cereal bag 100. Second sealing apparatus 504 is configured to form a substantially horizontal non-continuous middle seal 204 at an offset above the bottom seal 202. It should be appreciated that the position of the first sealing apparatus 502 in relation to the second sealing apparatus 504 may be adjusted in order to vary the offset between the bottom seal 202 and the middle seal 204.

It should be appreciated that although the two seals 202 and 204 are described as being formed by two separate components, the first and second sealing apparatuses 502 and 504 that move independently of one-another, the two seals may also be formed by a single component (not shown). For example, a sealing apparatus configured to form a substantially horizontal continuous bottom seal may be include an extension or add-on that also forms a substantially horizontal non-continuous seal at an offset above the continuous seal. Thus, the two seals 202 and 204 can be formed simultaneously as a result of a single component applying heat to two different locations on a cereal bag.

In order to form bottom and middle seals 202 and 204, first and second sealing apparatuses 502 and 504 include heat plates for applying heat to the plastic. Applying heat causes the plastic to melt together and form a seal along the points of contact with the heat plates. Accordingly, a first heat plate (not shown) of the first sealing apparatus 502 is configured to make continuous contact with the plastic 402 along a horizontal line in order to form a continuous seal.

Figure 6A:
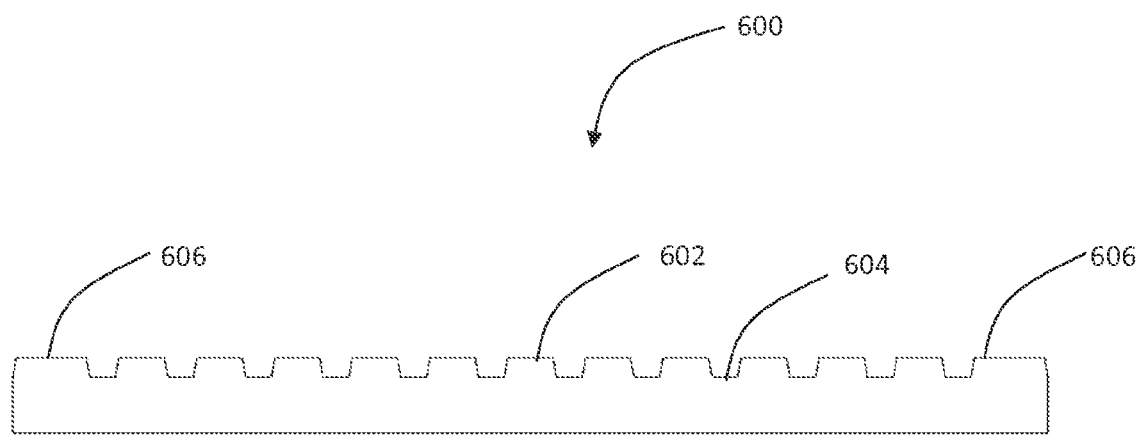
FIG. 6A illustrates an example heat plate for creating a non-continuous seal.

A second heat plate 600 of the second sealing apparatus 504, as illustrated in FIG. 6A, is configured to make non-continuous contact with the plastic 402. In particular, the second heat plate 600 has a series of protruding ridges 602 separated by a series of recessed gaps 604. When the second heat plate 600 is pressed against the plastic 402, the protruding ridges 602 make contact with the plastic 402 and thus create sealed portions 206 which prevent cereal from falling into the crumb compartment 104. The recessed gaps 604 in the second heat plate 600 create spaces were no heat is applied to the plastic when the second heat plate 600 is pressed against the plastic 402. This allows for open portions 208 or slots to be formed in between the sealed portions 206 which create small pathways for allowing crumbs to pass through into the crumb compartment 104.

The second heat plate 600 includes outer protruding ridges 606 that are wider than the protruding ridges 602 in order to create outer-most sealed portions 210 having extended lengths as compared to the inner sealed portions 206.

Figure 6B:
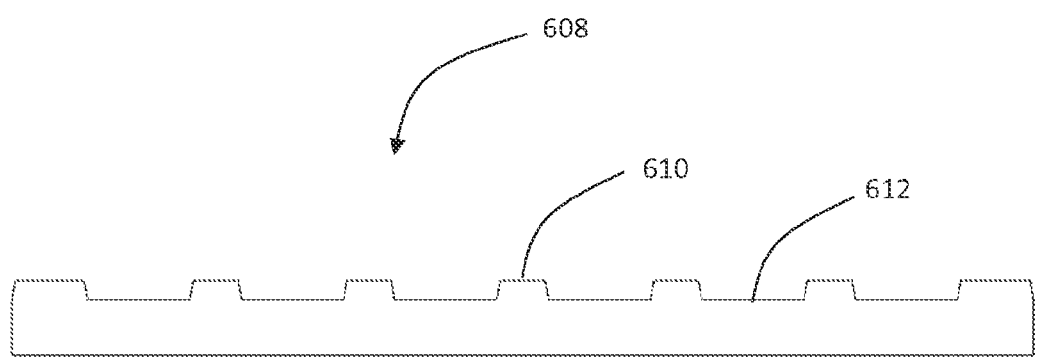
FIG. 6B illustrates an example heat plate for creating a non-continuous seal

It should be appreciated that the protruding ridges 602 can be any suitable width. It should be further appreciated that the recessed gaps 604 can be any suitable width. It should also be appreciated that the second heat plate 600 may include any suitable number of protruding ridges 602 and recessed gaps 604. For example, as illustrated in FIG. 6B, a heat plate 608 can include recessed gaps 612 that are wider than the protruding ridges 610.

Referring back to FIG. 5, it should be appreciated that the first and second sealing apparatuses 502 and 504 can be configured to create bottom and middle seals 202 and 204 respectively, either simultaneously or sequentially.

Figure 7:
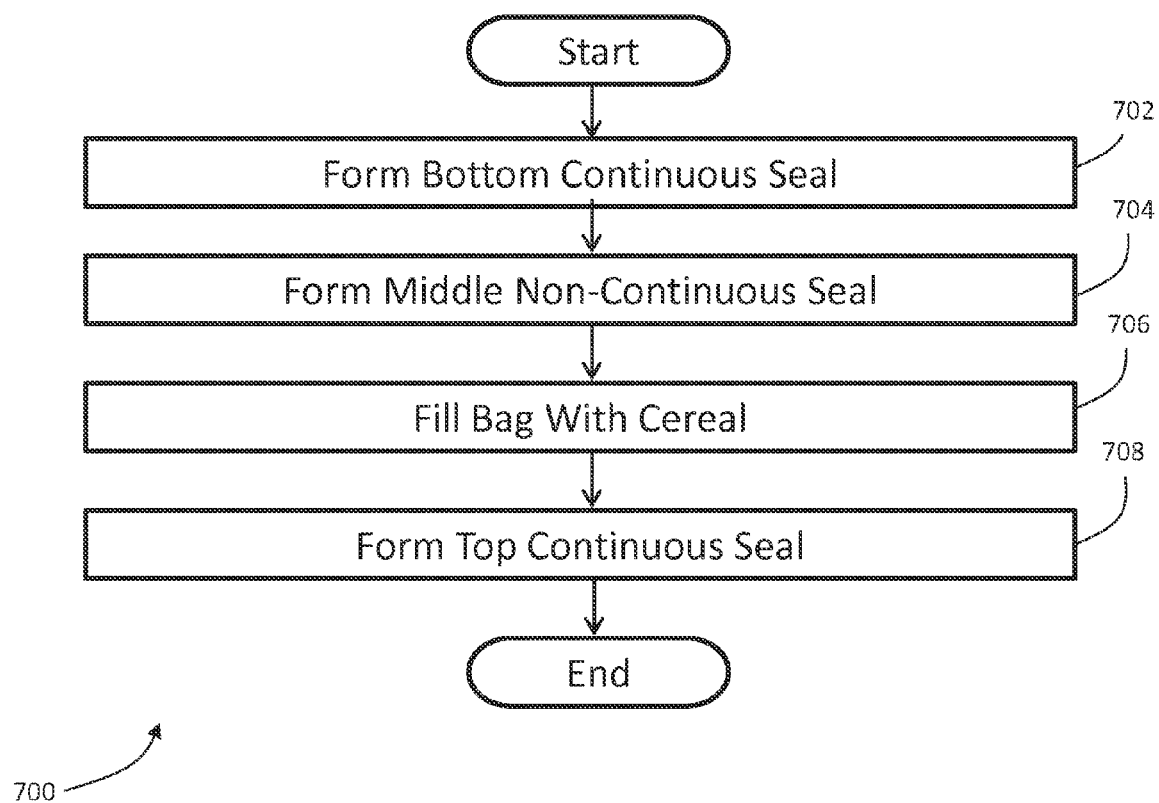
FIG. 7 illustrates a flow chart of an example method for creating a cereal bag with crumb collector.

FIG. 7 illustrates a flow chart of an example method for creating a cereal bag with crumb collector 100. At step 702, a first sealing apparatus 502 forms a continuous bottom seal 202 substantially horizontal along the bottom of cereal bag 100.

At step 704, a second sealing apparatus 504 forms a non-continuous middle seal 204 substantially horizontal along the middle portion of the cereal bag 100, at an offset above the bottom seal 202.

At step 706, the cereal bag 100 is filed with cereal. At step 708, a continuous seal is formed at the top of the cereal bag 100.

In one example, the method further includes the step of inserting the cereal bag 100 or liner into a cereal box (not shown). The box can be cardboard, paper, or any suitable material for packaging the bag of cereal. In on example, an adhesive or another suitable support means can be applied between the cereal bag 100 and the box to hold the cereal bag 100 at a desired position inside the box in order to support the cereal bag 100 and to prevent the main compartment 102 of the cereal bag 100 from settling onto the crumb compartment 104 under its own weight, thereby preventing crumbs from effectively passing into the crumb compartment 104.

While example systems, methods, and so on, have been illustrated by describing examples, and while the examples have been described in considerable detail, it is not the intention to restrict or in any way limit the scope of the appended claims to such detail. It is simply not possible to describe every conceivable combination of components or methodologies for purposes of describing the systems, methods, and so on. With the benefit of this application, additional advantages and modifications will readily appear to those skilled in the art. The scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

The invention claimed is:

1. A bag, comprising:
   a main compartment;
   a crumb collector compartment, disposed below the main compartment, wherein the crumb collector compartment comprises a perforated portion extending diagonally between a first side wall of the crumb collector compartment and a bottom of the bag;
   a substantially horizontal non-continuous seal disposed between the main compartment and the crumb collector compartment, wherein the substantially horizontal non-continuous seal comprises a plurality of sealed portions extending across the bag wherein the bag is melted together at each of the sealed portions, and a plurality of open portions wherein each of the open portions is disposed across the bag between the sealed portions and within the substantially horizontal non-continuous seal, and wherein the sealed portions comprise outer-most sealed portions, wherein each of the outer-most sealed portions is disposed at an end of the substantially horizontal non-continuous seal, and wherein the outer-most sealed portions extend along extended lengths that are greater than lengths of the sealed portions disposed between the outer-most sealed portions; and
   a continuous seal disposed below the crumb collector compartment.

2. A cereal bag comprising:
   a top compartment;
   a bottom compartment disposed below the top compartment, wherein the bottom compartment comprises a perforated portion extending diagonally between a first side wall of the bottom compartment and a bottom of the cereal bag;
   a non-continuous seal comprising a plurality of sealed portions extending across the cereal bag wherein the cereal bag is melted together at each of sealed portions, and a plurality of open portions wherein each of the open portions is disposed across the cereal bag between the sealed portions and within the non-continuous seal, and wherein the non-continuous seal is disposed between the top compartment and the bottom compartment and wherein the sealed portions comprise outer-most sealed portions, wherein each of the outer-most sealed portions is disposed at an end of the non-continuous seal, and wherein the outer-most sealed portions extend along extended lengths that are greater than lengths of the sealed portions disposed between the outer-most sealed portions.

3. A method for manufacturing a cereal bag with a crumb collector, comprising the steps of:
   forming a continuous first seal substantially horizontal along a bottom of a cereal liner;
   providing a heat plate comprising a plurality of protruding ridges;
   making non-continuous contact between the cereal liner and the plurality of protruding ridges of the heat plate;
   melting the cereal liner with the heat plate to form a non-continuous second seal substantially horizontal along a middle portion of the cereal liner at an offset distance above the first seal, the non-continuous second seal comprising a plurality of sealed portions wherein the sealed portions comprise outer-most sealed portions, wherein each of the outer-most sealed portions is disposed at an end of the non-continuous second seal, and wherein the outer-most sealed portions extend along extended lengths that are greater than lengths of the sealed portions disposed between the outer-most sealed portions;
   filing the cereal liner with cereal; and
   forming a continuous third seal substantially horizontal along a top of the cereal liner, wherein the cereal liner comprises a perforated portion extending diagonally between a side wall and the bottom of the cereal liner.

4. The method of claim 3, wherein the cereal liner comprises plastic.

5. The method of claim 3, further comprising the steps of:
   inserting the cereal liner comprising the cereal into a cereal box; and
   applying an adhesive between the cereal liner and the cereal box.

* * * * *